United States Patent

Horowitz et al.

[11] 4,109,673
[45] Aug. 29, 1978

[54] COMBINATION GLADHAND AND SHUTOFF COCK

[75] Inventors: Charles Horowitz, Niles; Frederic Lissau, Chicago, both of Ill.

[73] Assignee: Sloan Valve Company, Chicago, Ill.

[21] Appl. No.: 716,378

[22] Filed: Aug. 23, 1976

[51] Int. Cl.² .............. F16K 27/08; F16L 35/00
[52] U.S. Cl. .................. 137/381; 251/96; 251/99; 251/101; 251/109; 251/288
[58] Field of Search .......... 251/89, 95, 96, 98, 251/99, 100, 101, 107, 109, 111, 114, 116, 287, 315, 288; 137/377, 381

[56] References Cited

U.S. PATENT DOCUMENTS

| 932,188 | 8/1909 | Strelezky | 251/99 |
|---|---|---|---|
| 952,121 | 3/1910 | Koehler | 251/99 |
| 952,743 | 3/1910 | Jenkins | 251/99 |
| 1,058,637 | 4/1913 | Shephard | 137/381 |
| 1,142,579 | 6/1915 | Jones | 137/381 |
| 1,663,952 | 3/1928 | Peaden | 137/381 |
| 1,696,283 | 12/1928 | Pratt | 251/98 |
| 2,147,287 | 2/1939 | Farmer | 251/109 |
| 2,665,879 | 1/1954 | Housekeeper et al. | 251/95 |
| 3,355,141 | 11/1967 | Cooper | 251/101 |
| 3,714,968 | 2/1973 | Billeter | 251/315 |

FOREIGN PATENT DOCUMENTS 502,691  3/1939  United Kingdom ............ 251/96

*Primary Examiner*—Martin P. Schwadron
*Assistant Examiner*—G. L. Walton
*Attorney, Agent, or Firm*—Kinzer, Plyer, Dorn & McEachran

[57] ABSTRACT

A combination gladhand and shutoff cock includes a dust cover attached to the shutoff cock operating handle and closing the gladhand body air outlet when the shutoff cock is in a closed position. There is a latch effective between the shutoff cock handle and the gladhand body holding the shutoff cock in a closed position and a further latch between the shutoff cock handle and the gladhand holding the handle in an open position.

1 Claim, 8 Drawing Figures

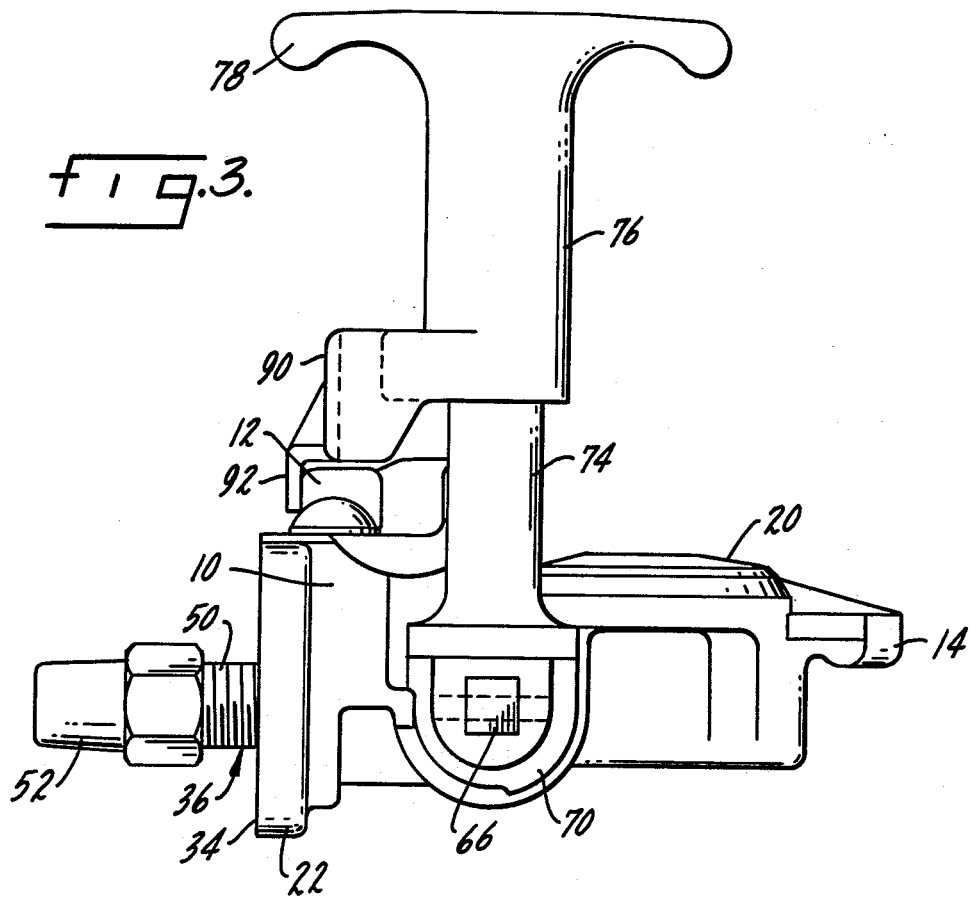

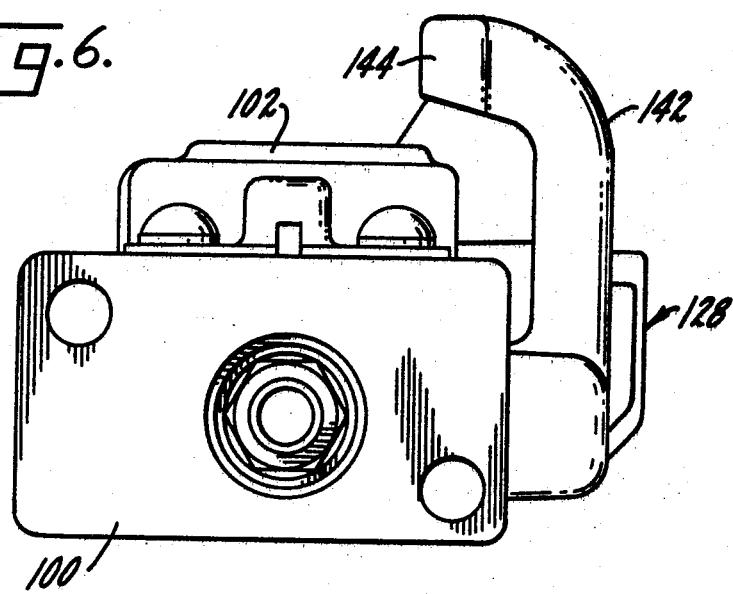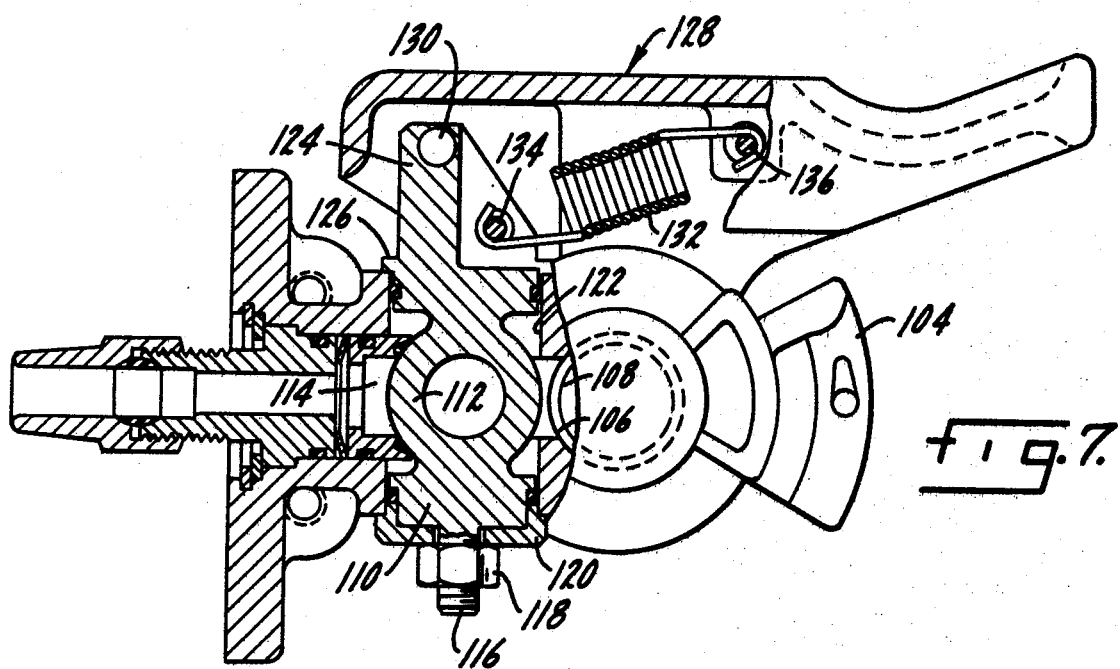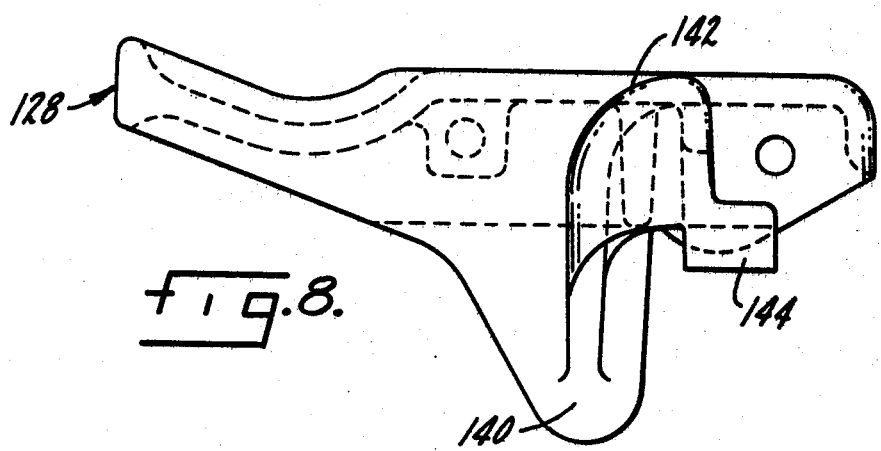

COMBINATION GLADHAND AND SHUTOFF COCK

SUMMARY OF THE INVENTION

The present invention relates to a combination gladhand and shutoff cock and has particular relation to such a structure including a latch preventing accidental opening or closing of the shutoff cock.

Another purpose is a structure of the type described including a dust cover mounted with the shutoff cock handle for closing the glandhand air outlet.

Another purpose is a combination of the type described which prevents connection of the gladhand body without first opening the shutoff cock.

Another purpose is a combination of the type described which prevents closure of the shutoff cock without first disconnecting the gladhand body.

Other purposes will appear in the ensuing specification, drawings and claims.

BRIEF DESCRIPTION OF THE DRAWINGS

The invention is illustrated diagrammatically in the following drawings wherein:

FIG. 3 is a side view, similar to FIG. 2, but showing the shutoff cock in an open position, FIG. 5 is a top view of a modified structure of the type described, FIG. 6 is an end view of the structure of FIG. 5, FIG. 7 is a section along plane 7—7 of FIG. 5, and FIG. 8 is a side view of the handle of FIG. 5.

DESCRIPTION OF THE PREFERRED EMBODIMENT

Figure 1:
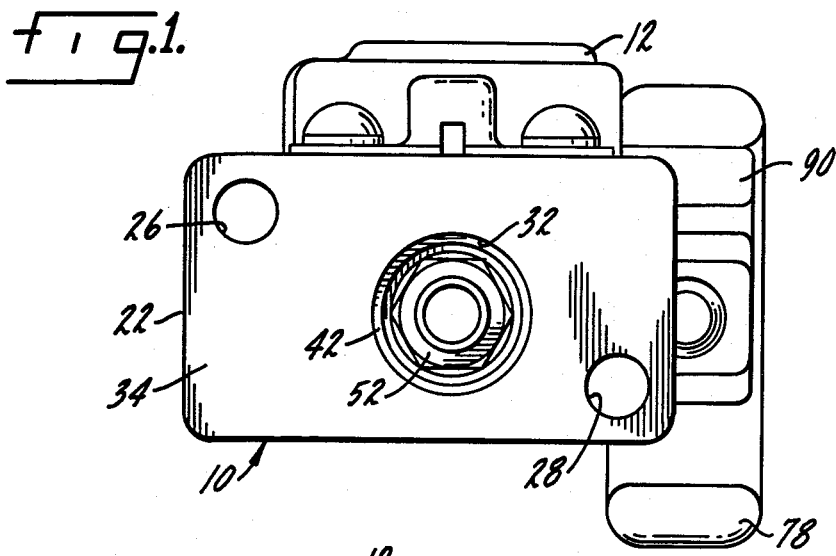
FIG. 1 is a plan view of a combination of the type described.

The particular combination gladhand and shutoff cock disclosed herein has application in the trucking field, and particularly at the rear of a trailer which will pull a second trailer. Specifically, the present invention is an improvement on the structure shown in U.S. Pat. No. 3,960,365, assigned to the assignee of the present application.

A dust cover closes the air outlet in the gladhand body, which dust cover is attached to the shutoff cock handle. There is a latch structure on the handle which prevents accidental opening of the shutoff cock and a similar latch which prevents accidental closing of the shutoff cock. The cooperation between the dust cover and the handle is such that the gladhand body cannot be connected to a similar structure without first opening the shutoff cock, with the dust cover also preventing closing of the shutoff cock unless the gladhand body is first disconnected from a similar structure.

In the structure of FIGS. 1-4, a gladhand body 10 has a first camming surface 12 and a second camming surface 14, both of which are conventional and are used to connect with similar surfaces of an opposing gladhand body. The body 10 has an air chamber 16 with an outlet port 18 surrounded by a conventional gladhand seal member 20.

At one end of the body 10 is a mounting flange 22 having mounting holes 26 and 28 which are used to attach the gladhand structure directly to a trailer.

There is a passage 30 connecting air outlet chamber 16 and an air inlet 32 which is formed in surface 34 of flange 22. Positioned within passage 30 is a fitting 36 and a bushing 38. Positioned adjacent the bushing, and between bushing 38 and chamber 16, is a shutoff cock or valve member 40.

Looking specifically at fitting 36, it is held in position within passage 30 by a ring 42 which holds a flange portion 44 of fitting 36 against a shoulder 46. An O-ring seal 48 seals the exterior of the fitting with the interior of passage 30.

Fitting 36 has an outwardly-extending tubular portion 50 which threadedly mounts an adjusting nut 52. Details of this construction are described in the above-mentioned patent.

Valve member 40 has a ball-shaped portion 54 with a passage 56 extending therethrough. At one side of the ball-shaped portion 54 the valve member has a cylindrical portion 58 which fits within a bore 60 in the body 10. The opposite end of the valve member 40 has a similar cylindrical portion 62 fitting within bore 60 and an external flange 64 preventing removal, in one direction, of the valve member. The first-described end of valve member 40 has a stem 66 attached to a handle structure indicated generally at 68. Handle 68 includes a flange 70 seated upon a shoulder 72 surrounding bore 60 so as to prevent removal of the valve member in the opposite axial direction.

Handle structure 68 includes a tubular portion 74 mounting a latch member 76 which includes a hand gripping portion 78. Latch member 76 mounts a rod 80 which extends within the hollow interior of tubular portion 74 and is encircled by a coil latching spring 82. Spring 82 is compressed between a wall 84 of tubular portion 74 and the head 86 of rod 80.

Figure 4:
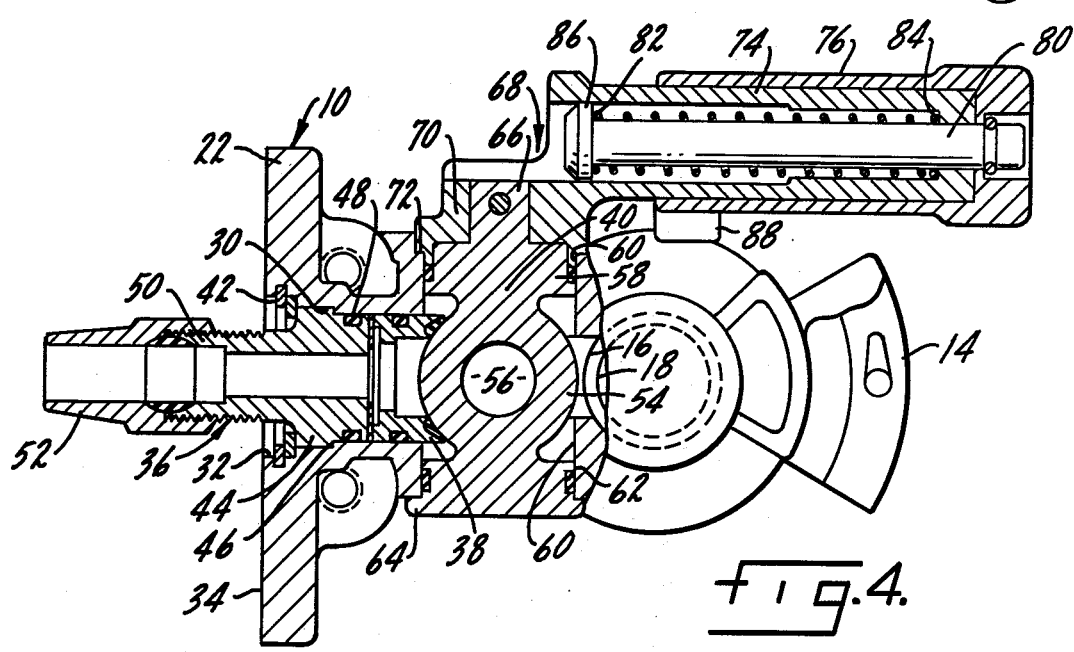
FIG. 4 is a section along plane 4—4 of FIG. 2.

Depending from latch member 76 is a key 88 which, as shown particularly in FIG. 4, prevents counterclockwise rotation of handle 68, and thus valve member 40, unless latch member 76 is first pulled in an outward direction to release the key from a position to contact gladhand body 10. Thus, key 88 normally holds the handle and thus valve member 40 in the closed position of FIG. 4 until such time as the key is released by the described outward movement.

Attached to the structure of handle 68 is a dust cover 90 which normally overlies and closes outlet port 18 of the gladhand. Forming a part of dust cover 90 is a latch member 92, shown particularly in FIGS. 2 and 3. After the handle has been released by outward movement of latch 76, the valve member and the handle can be rotated counterclockwise to place the valve member in an open position. When latch member 76 is subsequently released, causing it to move in an inward direction, the dust cover of latch member 92 will interlock with camming surface 12 of the gladhand to hold the handle and thus the valve member in an open position, as particularly shown in FIG. 3.

Figure 2:
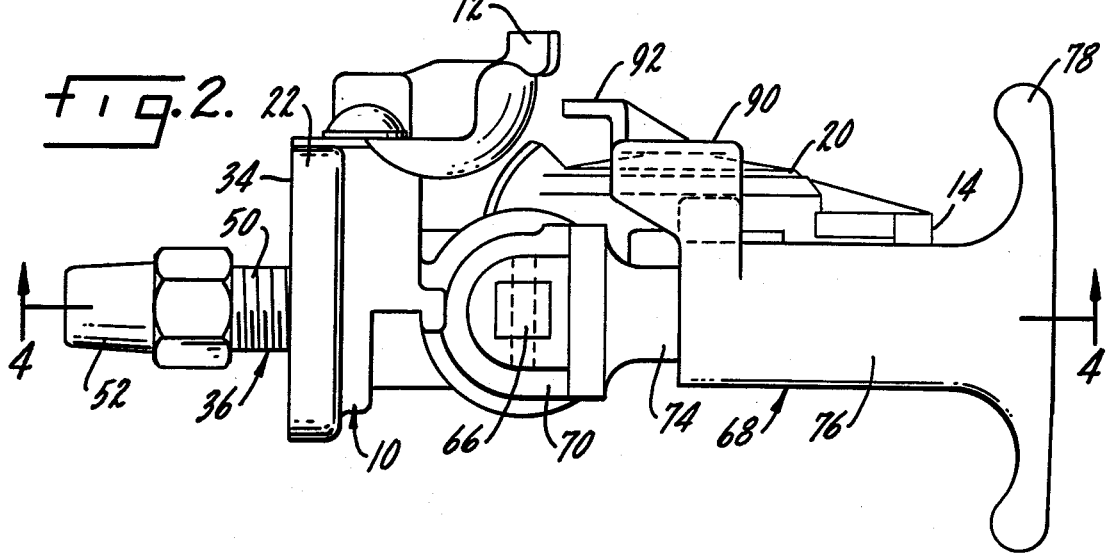
FIG. 2 is a side view of the structure of FIG. 1, with the shutoff cock in a closed position.

When the shutoff cock, or valve member 40, is in the closed position of FIGS. 2 and 4, the dust cover closes the gladhand outlet port. Before a similar gladhand structure can be connected, in the conventional manner, dust cover 90 must first be removed. Removal of the dust cover can only be accomplished by release of the latch holding the handle and the valve member in a closed position. Thus, the dust cover cannot be removed until the shutoff cock is opened. Once the shutoff cock has been opened, and the connection made to a mating gladhand structure, it is impossible to close the shutoff cock. The shutoff cock cannot be closed until the mating gladhand has first been removed, permitting the dust cover to return to its position closing outlet port 18. Thus, not only is the shutoff cock latched to prevent accidental opening or closing due to vibration and the like, but a vehicle operator making the connection between gladhands cannot make the connection without first opening the shutoff cock and he cannot close the shutoff cock without first breaking the connection between the two gladhands.

In the structures of FIGS. 5–8, a gladhand body is indicated at 100 and has camming surfaces 102 and 104 similar to those described above. An air chamber 106 has an outlet port 108 and a valve member 100 with a cylindrical portion 112 is positioned within an air passage 114. Valve member 110 has a stem 116 with a nut 118 threaded thereon, which nut cooperates with a collar 120 in mounting valve member 110 within bore 122.

At the opposite end of valve member 110 there is an upstanding mounting stem 124 and an adjacent flange 126 which overlies a portion of the gladhand body to thus secure the valve member within the body.

A handle indicated generally at 128 is pivotally mounted, as at 130, to stem 124. A spring 132 is fastened to stem 124, as at 134, and to the handle, as at 136. Spring 132 normally tends to maintain the handle in the closed position of FIG. 7.

A dust cover 140 is integral with handle 128 (FIG. 8) and normally closes outlet port 108 in the manner described in connection with the structure of FIGS. 1–4. Handle 128 includes an arm 142 having a projection 144 which projection will interlock and latch with a portion of a mating gladhand body. Handle 128 and valve member 110 rotate in a clockwise direction to move to an open position. Such movement is prevented by dust cover portion 140. To release the latch, handle 128 is first rotated upwardly about its pivot 130, against the force of spring 132. Once the handle has been rotated a sufficient distance in the described direction, approximately 45 degrees, dust cover 140 will clear the gladhand body, thus permitting the handle to be rotated in a clockwise manner to open valve member 110. After such rotational movement has been completed, and the handle released, projection 144 will interlock with a portion of a mating gladhand. In this position, the valve member and handle are latched in the open position, similar to that described in connection with the structure of FIGS. 1–4. To close the valve member, and thus return the dust cover to the closed position, the handle must again be rotated about its pivot, against the force of spring 132, to release the open position latch. The handle is rotated back to a position where the valve member closes passage 114 and then the handle is pivoted to return to the position of FIG. 7. Thus, there is a latch in both the open and closed positions in the manner described in connection with the structure of FIGS. 1–4. In the structure of FIGS. 1–4 there is an outward pull to release the closed valve position of the latch, whereas, in the structure of FIGS. 5–8, there is pivotal movement of the handle to release the latch.

In both structures, the dust cover closes the gladhand body outlet port in the closed position of the shutoff cock. The connection to the mating gladhand cannot be made unless the shutoff cock is first opened and the shutoff cock cannot be subsequently closed unless the connection is first broken.

Whereas the preferred form of the invention has been shown and described herein, it should be realized that there may be many modifications, substitutions and alterations thereto.

The embodiments of the invention in which an exclusive property or privilege is claimed are defined as follows:

1. In a combination gladhand and shutoff cock, a gladhand body having an air inlet and an air outlet, a flow passage through said body connecting said inlet and outlet, a valve chamber in said body in fluid communication with said flow passage and a rotatable valve member positioned in said valve chamber for controlling flow through said passage, a tubular member for rotating said valve member attached to one end thereof, a latch member slidably mounted on said tubular member, said latch member comprising a generally cylindrical hollow body portion, a gripping portion adjacent to one end of said latch member body portion, a cover portion extending from said latch member body portion and positioned to seat upon and to close said air outlet when said rotatable valve member closes said air passage, and a latching portion on said latch member movable between latched and unlatched positions, said latching portion of said latch member cooperating with said gladhand body when in the latched position to prevent rotation of said latch member and said rotatable valve member when said rotatable valve member is in a closed position, a rod axially positioned within said tubular member, said rod having an increased diameter head at one end, with the other end of said rod extending into and being attached to said latch member, a spring positioned on said rod, said spring normally biasing said latching portion of said latch member to said latching position.

* * * * *